United States Patent [19]

Buckshaw et al.

[11] Patent Number: 5,477,010

[45] Date of Patent: Dec. 19, 1995

[54] SAFETY PLATE ASSEMBLY

[76] Inventors: Dennis J. Buckshaw, 42240 Crestview, Northville, Mich. 48167; James A. Clark, 7309 Manner Cir. #202, Westland, Mich. 48185

[21] Appl. No.: 123,333

[22] Filed: Sep. 17, 1993

[51] Int. Cl.$^6$ ............................................... H01R 13/453
[52] U.S. Cl. ............................ 174/67; 439/137; 439/145
[58] Field of Search ....................... 174/66, 67; 220/241, 220/242; 439/137, 145

[56] References Cited

U.S. PATENT DOCUMENTS

| | | | |
|---|---|---|---|
| 2,477,803 | 8/1949 | Huber | 439/137 |
| 2,710,382 | 6/1955 | Fitzpatrick et al. | 439/137 |
| 2,820,842 | 1/1958 | Meistrell | 174/67 |
| 3,068,442 | 12/1962 | Kubik et al. | 439/136 |
| 3,222,631 | 12/1965 | Cohen et al. | 439/137 |
| 3,865,456 | 2/1975 | Dola | 439/137 |
| 4,094,569 | 6/1978 | Dietz | 439/137 |
| 4,293,173 | 10/1981 | Tricca | 439/148 |
| 4,600,258 | 7/1986 | Hu | 439/140 |
| 4,640,564 | 2/1987 | Hill | 439/137 |
| 4,798,916 | 1/1989 | Engel et al. | 174/67 |
| 4,835,343 | 5/1989 | Graef et al. | 174/66 |
| 5,073,681 | 12/1991 | Hubben et al. | 174/66 |
| 5,180,886 | 1/1993 | Dierenbach et al. | 174/66 |

Primary Examiner—Leo P. Picard
Assistant Examiner—David Tone
Attorney, Agent, or Firm—Young, MacFarlane & Wood

[57] ABSTRACT

A safety plate assembly for use with a conventional electric outlet of the type adapted to be fitted in a panel opening and including an outlet box and an outlet mounted in the box and including a receptacle defining a pair of sockets receiving the prongs of an electric plug. The assembly includes an annular mounting plate of open frame configuration positioned against the panel in surrounding relation to the opening and a cover plate positioned over the mounting plate and lockingly secured thereto by coacting locking finger and tab on the plates. A slide is mounted on the cover plate for movement between a safety position in which slide apertures overlie solid portions of the cover plate and an operative position in which the slide apertures are aligned with open areas of the cover plate and with the sockets of the receptacle so as to allow the prongs of the electric plug to be passed through the slide apertures and through the open areas of the cover plate for insertion in the receptacle sockets. The slide includes a shutter portion overlying the front face of the cover plate, a guide portion coacting with the rear face of the cover plate, and a juncture portion passing through an opening in the cover plate. The guide portion of the slide also coacts with the front face of the mounting plate to further facilitate the sliding movement of the slide.

12 Claims, 4 Drawing Sheets

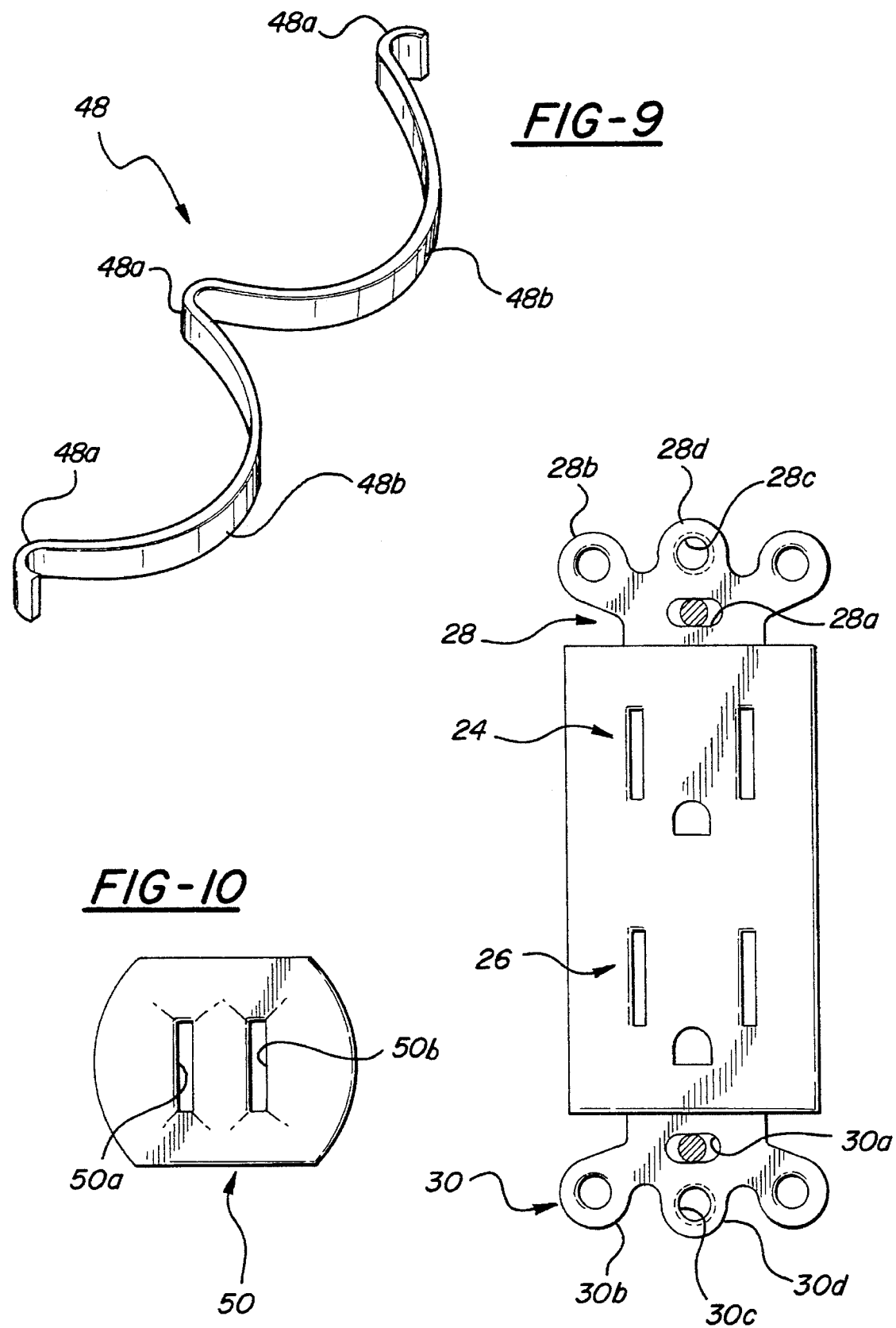

SAFETY PLATE ASSEMBLY

BACKGROUND OF THE INVENTION

This invention relates to a safety plate assembly for use with an electrical outlet, Since the electrical contacts of the conventional electric outlet are continuously energized they represent a source of danger for electrical shocks and short circuits. While the prongs of an electrical plug are designed to be safely inserted within the outlet sockets, it is possible to cause a short circuit by insertion of a wire or other metal object into the sockets. Specifically, small children are frequently explorers and frequently, out of curiosity, insert bits of metal such as safety pins, hair pins, bits of wire or paper clips into the sockets in the outlet with resultant shock and possible injury.

One solution to this problem is the provision of plastic dummy plugs which plug into the sockets of the outlet to preclude the inadvertent insertion of pieces of metal into the sockets. However, these plastic dummy plugs are easily misplaced or broken and can be readily removed from the sockets.

Safety plate assemblies have also been proposed to replace the conventional cover plate for the outlet. The safety plate assemblies include a movable member which normally covers the sockets of the outlet, but which can be readily moved to a position allowing insertion of the prongs of an electrical plug into the sockets of the outlet. Whereas the safety plate assemblies represent an improvement over the dummy plugs, they suffer from one or more disadvantages. Specifically, the prior art safety plate assemblies require the installation of special electrical outlets to accommodate the safety plate assemblies and/or they can be readily removed from the outlet so as to readily defeat their safety function and/or they are very difficult to operate to allow the insertion of the prongs of the electrical plug and/or they have a complex and expensive construction and/or they are prone to failure.

SUMMARY OF THE INVENTION

This invention is directed to the provision of an improved safety plate assembly for use with a conventional electric outlet.

More specifically this invention is directed to the provision of an improved safety plate assembly for an electrical outlet which is simple and durable in construction, inexpensive to manufacture, smooth and efficient in operation, and resistant to any attempt to defeat its safety function.

The invention safety plate assembly is intended for use with a conventional electrical outlet assembly of the type adapted to be fitted in a panel opening and including an outlet box and an outlet mounted in the box and including a receptacle defining a pair of sockets for receiving the prongs of an electrical plug.

The invention assembly includes an annular mounting plate of open frame configuration; fastener means for securing the mounting plate to the outlet assembly with the mounting plate positioned proximate the panel in surrounding relation to the receptacle; a cover plate; and coacting means on the cover plate and on the mounting plate for securing the cover plate to the mounting plate with solid portions of the cover plate overlying the fastener means to preclude removal of the fastener means without removal of the cover plate. This arrangement makes it very difficult to defeat the safety aspect of the cover plate assembly since the fastener means securing the safety plate assembly in position are inaccessible.

According to a further feature of the invention, the coacting means on the cover plate and on the mounting plate are operative in response to relative movement between the cover plate and the mounting plate to snapingly and lockingly secure the plates together. This arrangement allows the mounting plate to be secured to the outlet assembly whereafter the cover plate may be pressed against the mounting plate to snapingly secure the cover plate to the mounting plate and substantially preclude unauthorized removal of the safety plate assembly from the outlet assembly.

According to a further feature of the invention, the cover plate includes a rear face positioned in confronting relation to the panel, a front face, an opening, and at least one prong aperture, and the safety plate assembly further includes a slide including a shutter portion overlying the front face of the cover plate and including at least one prong aperture for selective coaction with the prong aperture in the cover plate, a guide portion coacting with the rear face of the cover plate, and a juncture portion passing through the opening in the cover plate. This arrangement provides a simple and effective construction for allowing ready, positive sliding movement of the slide between safety and operative positions.

In the disclosed embodiment of the invention, the fasteners normally employed at the upper and lower ends of the outlet to secure the outlet to threaded apertures in the upper and lower ends of the outlet box are employed to secure the mounting plate to the outlet box; the cover plate includes a plurality of resilient fingers which coact with openings in the mounting plate in response to pressing of the cover plate against the mounting plate to snapingly and lockingly secure the cover plate to the mounting plate; the shutter portion of the slide guides slidably on the front face of the cover plate; and the guide portion of the slide is positioned between the rear face of the cover plate and the front face of the mounting plate and slides guidably and positively between the rear face of the cover plate and the front face of the mounting plate.

BRIEF DESCRIPTION OF THE DRAWINGS

FIG. 9 is a view of a spring employed in the cover plate assembly;

FIG. 10 is a view of an older form of electric receptacle; and

FIG. 11 is a view of a newer form of a dual electric receptacle.

DETAILED DESCRIPTION OF THE PREFERRED EMBODIMENT

Figure 1:
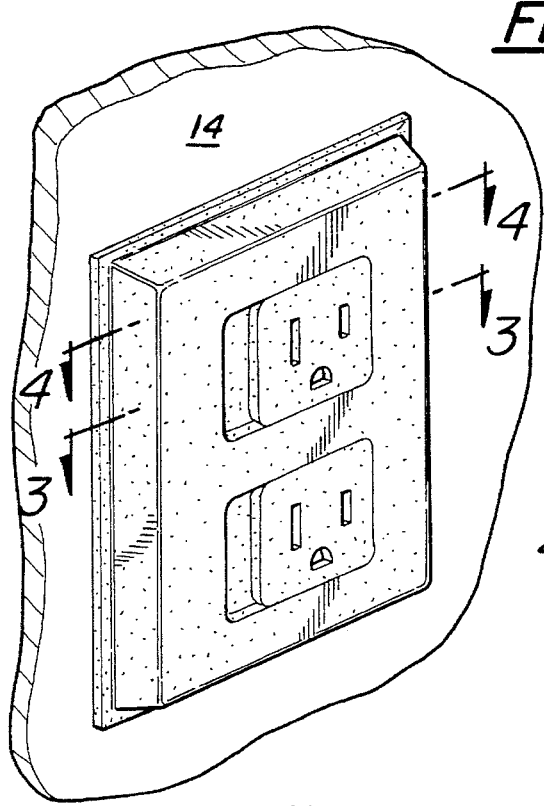
FIG. 1 is a perspective view of a safety plate assembly according to the invention shown in position in overlying relation to a conventional electric outlet assembly.
Figure 5:
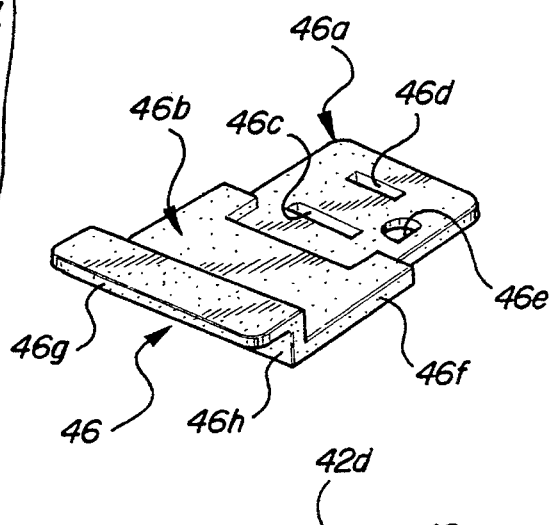
FIG. 5 is a perspective view of a slide utilized in the invention safety plate assembly.
Figure 7:
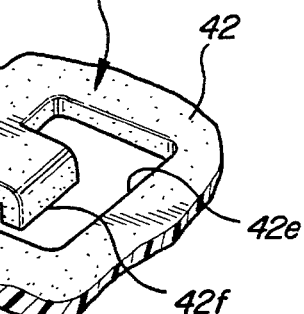
FIG. 7 is a fragmentary perspective view of a portion of a mounting plate employed in the cover plate assembly.
Figure 6:
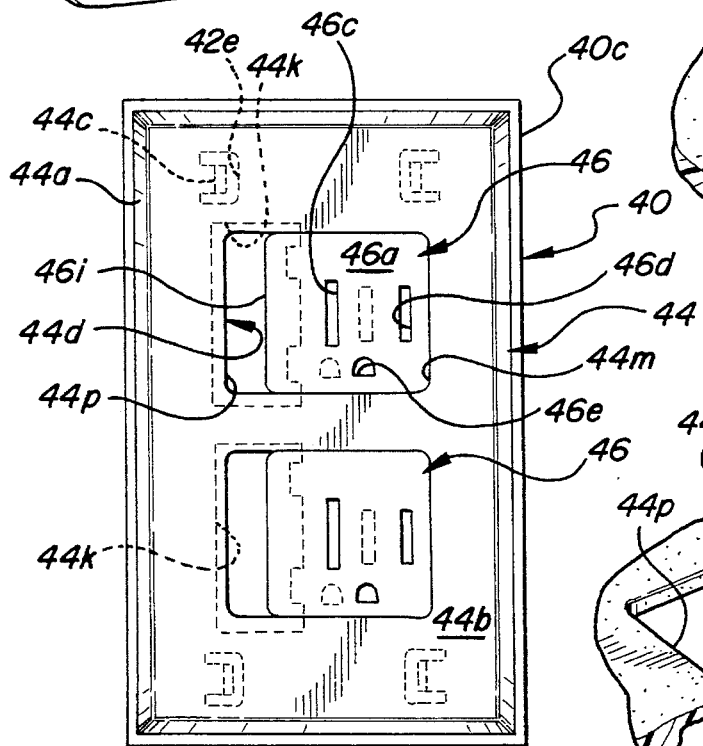
FIG. 6 is a front view of the invention safety plate assembly.
Figure 8:
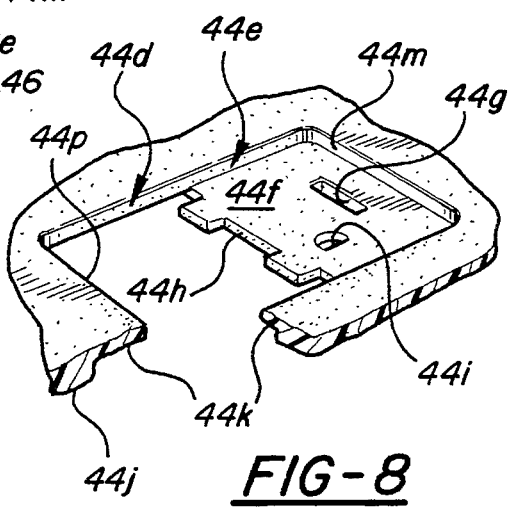
FIG. 8 is a fragmentary perspective view of a portion of a cover plate employed in the cover plate assembly.

The invention cover plate assembly is intended for use with an outlet assembly 10 positioned in an opening 12 of a wall panel 14 and including an outlet box 16 and an outlet 18.

Outlet box 16 has a known, generally rectilinear hollow configuration and is secured for example to a 2×4 22 with its open front end 16a positioned within panel opening 12.

Outlet 18 is of known form and comprises a dual receptacle outlet including upper and lower receptacles 24 and 26, an upper bracket 28, a lower bracket 30, and a central threaded bore 32 for receipt of the usual cover plate attachment screw. Each receptacle 24, 26 includes a pair of sockets 24a, 24b, 26a, 26b and a ground socket 24c, 26c. It will be understood that the sockets 24a, 24b, 26a, 26b, 24c, 26c conform to the configuration of the prongs of a conventionally electrical plug and are adapted to plugingly receive the prongs of the plug to establish electrical connection between the plug and the outlet in known manner.

Outlet 18 is typically secured to outlet box 16 by fastener screws 34 passing through apertures 28a and 30a in upper and lower brackets 28, 30 for threaded receipt in threaded apertures in upper and lower lugs 16b formed on the front face of the outlet box with ear portions 28b, 30b of the upper and lower brackets bearing against the front surface of panel 14 to fixedly secure the outlet to the outlet box and to the panel with the outlet positioned within the hollow of the outlet box for suitable connection of an electrical power source via leads 36 passing through an opening 16c in the outlet box.

The invention safety plate assembly includes a gasket 40, a mounting plate 42, a cover plate 44, slides 46 and a spring 48.

Gasket 40 is formed of a suitable gasket material and has a generally rectangular, open frame configuration including an annular inner periphery 40a sized to conform and fit generally around the opening 12 in the panel 14 with the rear face 40b of the gasket positioned against the front face of the panel.

Mounting plate 42 is formed of a suitable ferrous material and has a generally rectangular open frame configuration. The outer perimeter 42a of mounting plate 42 has a size and configuration smaller than the outer perimeter 40c of the gasket and greater than the inner perimeter 40a of the gasket, and the inner perimeter 42b of the mounting plate has a size and configuration less than the size and configuration of the inner perimeter 40a of the gasket but large enough to accommodate the receptacles 24, 26 of the outlet 18.

Mounting plate 42 further includes upper and lower slots 42c sized to pass fasteners 34, and a locking configuration 42d at each of the four corners of the plate. Each locking configuration 42d comprises an opening 42e formed in the plate and a rearwardly extending tab 42f positioned within the opening 42e.

Cover plate 44 is formed of a suitable molded plastic material and has a hollow configuration defined by an annular wall 44a and a front wall 44b. A plurality of fingers 44c extend rearwardly from front wall 44b proximate the four corners of the front wall for respective coaction with the locking tabs 42f on the mounting plate 42. A pair of openings 44d are provided, one above the other, in the front wall 44b and a pair of grooves 44e are provided in lateral association with each opening 44d. Each groove 44e is formed by a reduced thickness portion 44f of the front wall 44b. Each reduced thickness portion 44f is further configured to define a prong aperture 44g, a half prong aperture 44h, and a ground prong aperture 44i. The rear face 44j of the front wall is relieved to form a U-shaped groove 44k extending around the periphery of each opening 44d.

Each slide 46 is formed of a suitable molded plastic material and includes a generally rectangular shutter portion 46a and a generally rectangular guide portion 46b.

Shutter portion 46a has a thickness corresponding to the depth of groove 44e and has a configuration corresponding generally to the configuration of groove 44e. Shutter portion 46a defines a pair of prong apertures 46c and 46d and a ground prong aperture 46e.

Guide portion 46b includes a generally rectangular front portion 46f having a size and configuration generally corresponding to the groove 44k in the rear face of the front wall of the cover plate, a rear portion 46g and a flange portion 46h interconnecting front portion 46b and rear portion 46g. The thickness of front portion 46b corresponds to the thickness of groove 44k.

Spring 48 is a flat wave spring and includes anchor portions 48a and active portions 48b.

In the assembled relation of cover plate 44, slides 46, and spring 48, shutter portions 46a of the slides are positioned in grooves 44e of the cover plate; front guide portions 46b of the slides are positioned in grooves 44k of the cover plate; spring 48 is positioned in the hollow of the cover plate between a side wall 44a of the cover plate and the flange portion 46h of the slides with the spring anchor portions positioned against the side wall 44a and each spring active portion 48b engaging a flange portion 46h of a respective slide so as to urge the slides to a safety position in which the shutter portions 46a are urged against the end walls 44m of the grooves 46e so that the prong opening 46c, d and e in the shutter portions are laterally displaced with respect to the corresponding openings 44h, 44g, and 44i defined in the cover plate reduced thickness portions 44f.

To install the invention cover plate assembly on an associated outlet assembly 10, the conventional outlet cover plate is removed by unscrewing the cover plate attachment screw from threaded bore 32; the fasteners 34 are removed; gasket 40 is positioned against the front face of panel 14 in surrounding relation to panel opening 12 with gasket vertical edges 40d positioned proximate the side faces of the receptacles of the outlet to center the gasket with respect to the outlet; mounting plate 42 is positioned over gasket 40; fasteners 34 are passed through slots 42c and through apertures 28a, 30a in the upper and lower brackets of the outlet for threaded engagement with the lugs 16b of the outlet housing to fixedly secure the gasket and the mounting plate to the panel 14 and to the outlet assembly; and cover plate 44, with slides 46 slidably mounted therein, is positioned over mounting plate 42 and pressed rearwardly with respect to the mounting plate to move the fingers 44c of the cover plate through the apertures 42e in the mounting plate to lockingly and snapingly secure the cover plate to the mounting plate. It will be understood that the fingers 44c flex inwardly as they engage the tabs 42f and thereafter, once the locking end portions 44n of the prong portions have passed the rear ends of the tabs 42f, snap outwardly to allow the locking portions 44n to snapingly and lockingly engage with the tabs 42f. In the assembled relation of the mounting plate, gasket, and cover plate the rear annular edge 44p of the annular wall 44a of the cover plate seats against the outer peripheral front surface of the gasket and the outer peripheral edge portion 42a of the mounting plate is received in an annular notch 44q formed in the rear annular edge 44p of the annular wall 44a of the cover plate.

It will be seen that the cover plate, once lockingly secured to the mounting plate, covers the fasteners 34 so that the fasteners cannot be removed without removing the cover plate. Since a child, as a practical matter, can never undo the snapping, locking interengagement of the tabs 42f and the fingers 42c, the invention safety plate assembly cannot be removed by a child.

In the operation of the invention safety plate assembly, the prongs of the associated electric plug are positioned in the prong apertures 46c, 46d and 46e of the respective slide and a lateral force is applied to the plug to move the slide laterally in groove 44e to move the slide apertures 46c, 46d, 46e into alignment with cover plate aperture 44h, 44g and 44i, whereafter the prongs of the plug may be inserted through the slide apertures 46c, 46d, 46e and through the cover plate apertures 44h, 44g, 44i for insertion in the receptacle sockets 24a, 24b, 24c or 26a, 26b, 26c to establish electrical contact in known manner between the plug and the outlet. The lateral movement of the slide within the groove 44e is delimited and defined by engagement of the shoulder 46i of the shutter portion of the slot with the lateral edge 44p of the associated opening 44d.

It will be seen that the slide is firmly and positively guided in its lateral movement between its safety and operative positions with the shutter portion 46a sliding on the front face of the cover plate in groove 44e, the guide portion 46b of the slide guiding on the rear face of the cover plate in groove 44k, and the rear face of the slide portion 46g sliding on the front face of the mounting plate 42 with a juncture portion of the slide, constituted by the overlapping portions of the shutter portion 46a and the flange 46b, passing through the opening 44d to dispose the shutter portion 46a on the front face of the cover plate and dispose the guide portion on the rear face of the cover plate. Once the plug has been removed from the outlet, spring 48 acts to firmly and positively move the slide to its safety position in which the slide apertures 46c, d and e are laterally displaced with respect to the corresponding cover plate apertures to preclude insertion of a wire clip, etc. into the outlet by a curious child.

Figure 2:
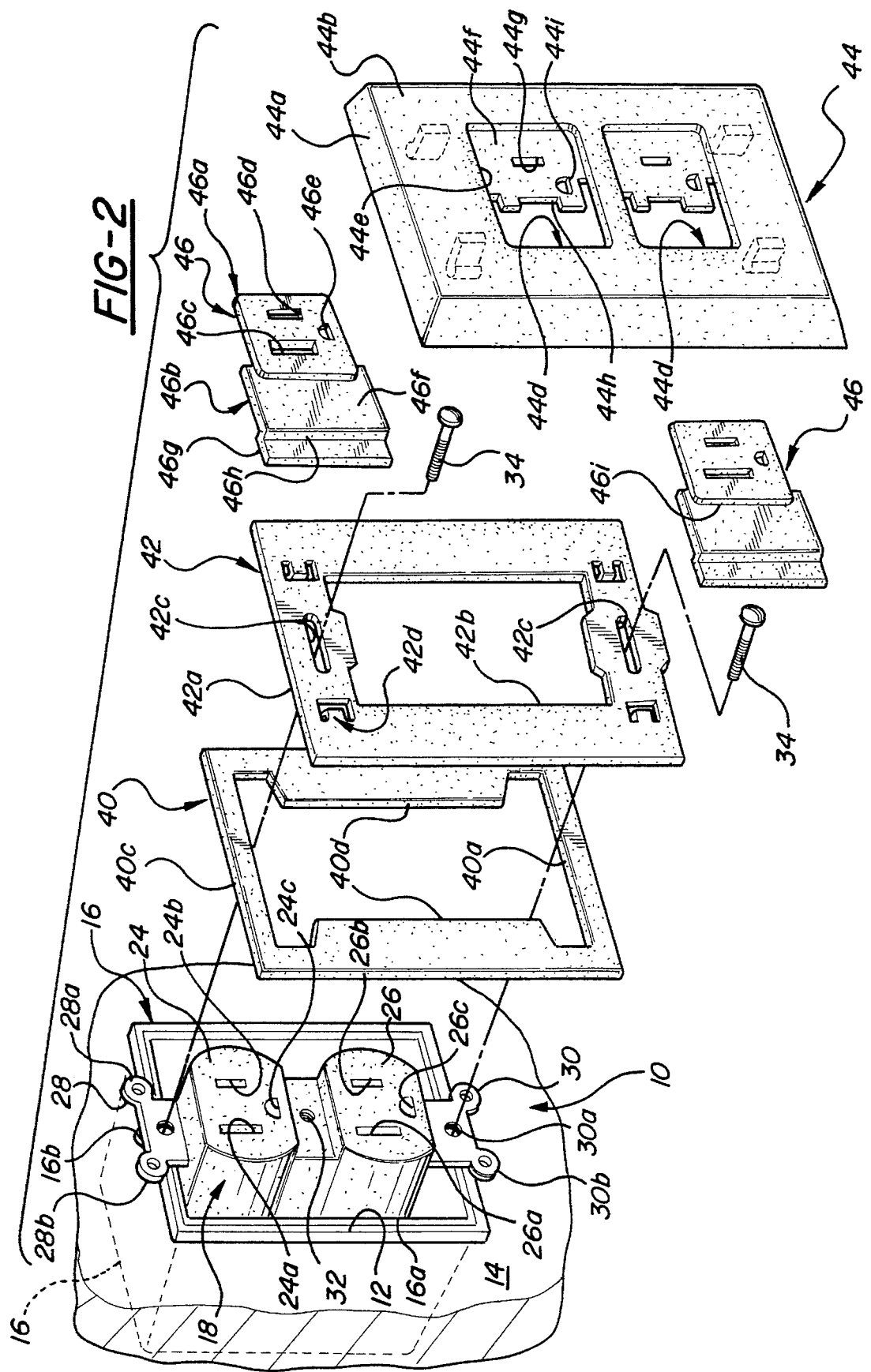
FIG. 2 is a exploded view of the safety plate assembly shown in association with an electric outlet assembly.
Figure 3:
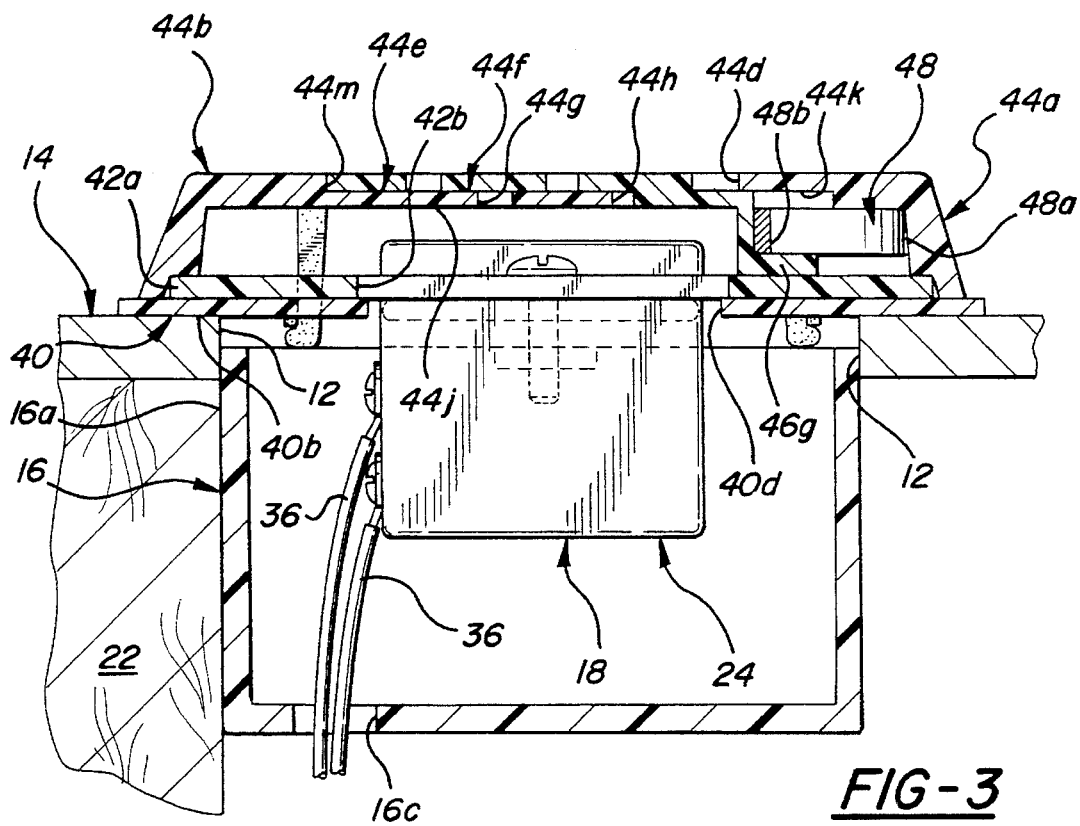
FIGS. 3 and 4 are cross-sectional views taken respectively on lines 3—3 and 4—4 of FIG. 1.
Figure 4:
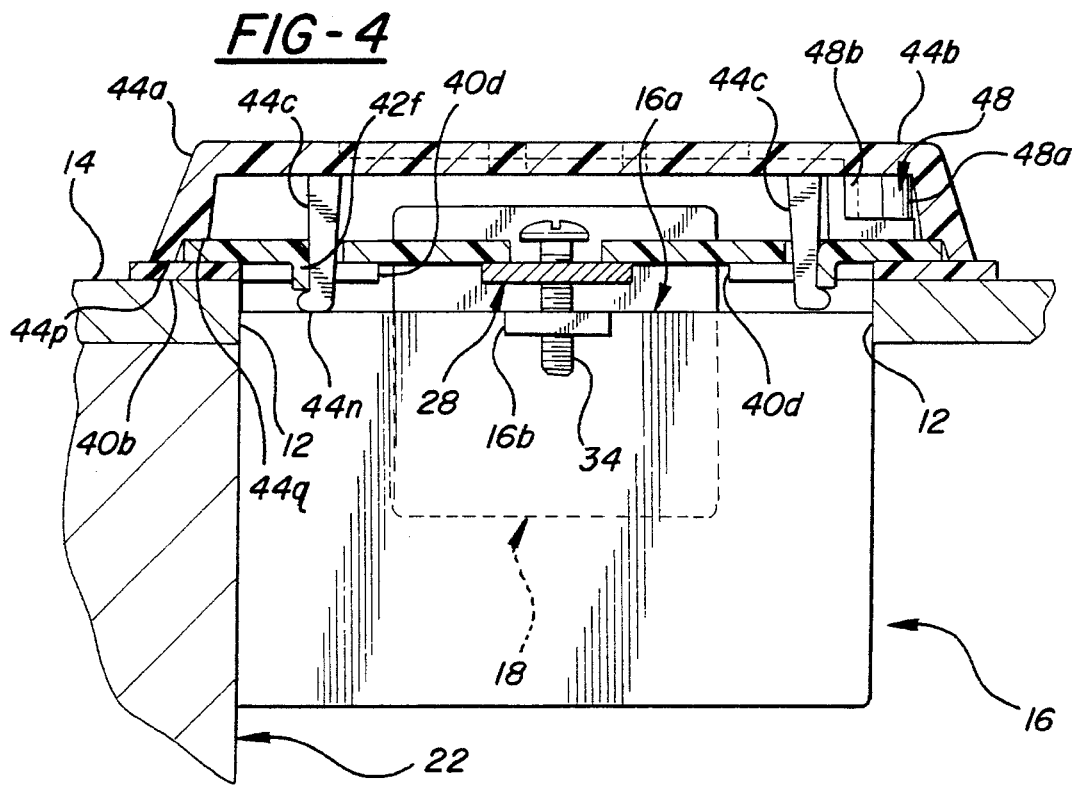

It will be seen that the invention safety plate assembly has important advantages as compared to prior art safety plate assemblies. For example, the assembly is difficult for a child to remove since the fastening members securing the assembly to the outlet assembly are inaccessible to the child by virtue to the locking, covering configuration of the cover plate relative to the fasteners. Further, the slide construction, whereby the slide is guided by the front and rear faces of the cover as well as by the mounting plate, provide a positive, precise sliding action of the slide and provides a long reliable life for the assembly. Further, the coaction of the gasket mounting plate and cover plate provides a positive sealed covering for the panel opening to prevent energy loss through the panel opening. Further, the invention safety plate assembly has universal application to all outlet and receptacle designs. For example, with reference to the newer rectangular dual receptacle construction seen in FIG. 11 where the upper and lower receptacles 24 and 26 open in a common flat front face of the outlet, the invention safety plate assembly does not have any unique configuration that is dependent on the oval configuration of the separate upper and lower receptacle design seen in FIG. 2 but rather, since the cover overlies the receptacles, the invention safety plate assembly may be used as a cover for the electric outlet irrespective of the specific configuration of the receptacles. Further, since the invention cover plate assembly does not depend upon a central threaded cover screw aperture between the upper and lower receptacles to attach the cover plate assembly, but rather utilizes the upper and lower screws attaching the outlet to the upper and lower lugs on the outlet box, the invention safety plate assembly may be utilized with the newer receptacle seen in FIG. 11 despite the fact that the receptacle of FIG. 11 does not have a central threaded aperture for receipt of a central cover plate screw but rather, for purposes of mounting the conventional cover plate, utilizes threaded apertures 28c, 30c in ear portions 28d, 30d positioned between the ear portions 28b, 30b of the mounting brackets 28 and 30. Further, with reference to the older receptacle 50 seen in FIG. 10 utilizing parallel sockets 50a and 50b centered in the face of the oval receptacle and lacking a ground socket, the slide plate apertures 46c, 46d and the coacting opening 44h, 44g are vertically oversized with respect to the vertical height of the receptacles 24a, 24b or 50a, 50b so that the invention circuit plate assembly may be utilized both with the socket placement of the grounded receptacle configurations of FIG. 1, in which the parallel sockets 24a and 24b are asymmetric with respect to the horizontal centerline of the receptacle, and with the older receptacle configuration of FIG. 10 in which the sockets 50a, 50b are symmetrical with respect to the horizontal centerline of the receptacle.

Whereas a preferred embodiment of the invention has been illustrated and described in detail it will be apparent that various changes will be made in the disclosed embodiment without departing from the scope or spirit of the invention.

We claim:

1. A safety plate assembly for use with a conventional electric outlet assembly of the type adapted to be fitted in a panel opening and including an outlet box and an outlet mounted in the box and including a receptacle defining a pair of sockets for receiving the prongs of an electric plug, said assembly including:

an annular mounting plate of open frame configuration;

fastener means for securing the mounting plate to the outlet assembly with the mounting plate positioned proximate the panel in surrounding relation to the receptacle;

a cover plate;

coating means on the cover plate and on the mounting plate for securing the cover plate to the mounting plate with solid portions of the cover plate overlying the fastener means to preclude removal of the fastener means without removal of the cover plate; and a safety member mounted on the cover plate for movement between a safety position in which access to the receptacle sockets by the prongs of the electric plug is blocked and an operative position in which access to the receptacle sockets by the prongs of the electric plug is provided.

2. A safety plate assembly according to claim 1 wherein:

the coacting means on the cover plate and on the mounting plate are operative in response to relative movement between the cover plate and the mounting plate to snapingly secure the plates together.

3. A safety plate assembly according to claim 2 wherein:

the coacting means comprise resilient fingers extending rearwardly from the cover plate, openings in the mounting plate, and rearwardly extending tabs on the mounting plate respectively positioned in the openings and lockingly coacting with the fingers of the cover plate in response to relative movement between the plates.

4. A safety plate assembly according to claim 1 wherein:

the fastener means is adapted to secure the mounting plate to the outlet box.

5. A safety plate assembly for use with a conventional electric outlet adapted to be fitted in an opening in a panel and including a receptacle defining sockets for receipt of the prongs of an electric plug, said assembly comprising:

a cover plate adapted to fit over the receptacle and including a rear face positioned in confronting relation to the panel, a front face, an opening, and at least one prong aperture; and a slide including a shutter portion overlying the front face of the cover plate and including at least one prong aperture for selective coaction with the prong aperture in the cover plate, a guide portion coacting with the rear face of the cover plate, and a juncture portion passing through the opening in the cover plate.

6. A safety plate assembly according to claim 5 wherein:

the assembly further includes an annular mounting plate of open frame configuration, means for securing the mounting plate to the outlet with the mounting plate positioned proximate the panel in surrounding relation to the receptacle, and coacting means on the cover plate and on the mounting plate for securing the cover plate to the mounting plate in overlying relation thereto.

7. A safety plate assembly according to claim 6 wherein:

the coacting means on the cover plate and on the mounting plate are operative in response to relative movement between the cover plate and the mounting plate to snapingly secure the plates together.

8. A safety plate assembly for use with a conventional electric outlet assembly of the type adapted to be fitted in a panel opening and including an outlet box and an outlet mounted in the box and including a receptacle defining a pair of sockets for receiving the prongs of an electric plug, said assembly including:

an annular mounting plate of open frame configuration;

means for securing the mounting plate to the outlet assembly with the mounting plate positioned proximate the panel in surrounding relation to the receptacle;

a cover plate;

coacting means on the cover plate and on the mounting plate for securing the cover plate to the mounting plate in overlying relation thereto; and a slide member having a pair of apertures sized to receive the prongs of an electrical plug and mounted on the cover plate for movement between a safety position in which the slide member apertures-overlie solid portions of the cover plate and an operative position in which the slide member apertures are aligned with open areas of the cover plate and with the sockets of the receptacles so as to allow the prongs of the plug to be passed through the slide plate apertures and through the open areas of the cover plate for insertion in the receptacle sockets.

9. A safety plate assembly according to claim 8 wherein the mounting plate is secured to the outlet box and the securing means comprises fasteners passing through apertures in the mounting plate for threaded engagement with threaded apertures in the outlet box.

10. A safety plate assembly according to claim 9 wherein:

the coacting means on the cover plate and on the mounting plate are operative in response to relative movement between the cover plate and the mounting plate to snapingly secure the plates together.

11. A safety plate assembly for use with a conventional electric outlet assembly of the type adapted to be fitted in a panel opening and including an outlet box and an outlet mounted in the box and including a receptacle defining a pair of sockets for receiving the prongs of an electric plug, said assembly including:

an annular mounting plate of open frame configuration;

fastener means for securing the mounting plate to the outlet assembly with the mounting plate positioned proximate the panel in surrounding relation to the receptacle;

a cover plate;

coating means on the cover plate and on the mounting plate for securing the cover plate to the mounting plate with solid portions of the cover plate overlying the fastener means to preclude removal of the fastener means without removal of the cover plate; and a slide member having a pair of apertures sized to receive the prongs of the electric plug and mounted on the cover plate for movement between a safety position in which the slide member apertures overlie solid portions of the cover plate and an operative position in which the slide member apertures are aligned with open areas of the cover plate and with the sockets of the receptacle so as to allow the prongs of the plug to be passed through the slide plate apertures and through the open areas of the cover plate for insertion into the receptacle sockets.

12. A safety plate assembly according to claim 11 wherein:

the cover plate includes a rear face positioned in confronting relation to the panel, a front face, an opening, and at least one prong aperture; and the slide includes a shutter portion overlying the front face of the cover plate and including at least one prong aperture for selective coaction with the prong aperture in the cover plate, a guide portion coacting with the rear face of the cover plate, and a juncture portion passing through the opening in the cover plate.

* * * * *